US009487206B2

(12) United States Patent
Asami et al.

(10) Patent No.: US 9,487,206 B2
(45) Date of Patent: Nov. 8, 2016

(54) DEVICE AND METHOD FOR CONTROLLING A HYBRID VEHICLE

(71) Applicant: Toyota Jidosha Kabushiki Kaisha, Toyota-shi Aichi-ken (JP)

(72) Inventors: Yoshikazu Asami, Susono (JP); Toshikazu Kato, Toyota (JP); Ryuta Teraya, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/487,634

(22) Filed: Sep. 16, 2014

(65) Prior Publication Data

US 2015/0081151 A1 Mar. 19, 2015

(30) Foreign Application Priority Data

Sep. 19, 2013 (JP) .................. 2013-194369

(51) Int. Cl.
*B60W 20/00* (2016.01)
*B60W 10/06* (2006.01)
*B60W 10/18* (2012.01)
*B60W 10/08* (2006.01)
*B60W 10/26* (2006.01)
*B60W 30/18* (2012.01)

(52) U.S. Cl.
CPC ............. *B60W 10/06* (2013.01); *B60W 10/08* (2013.01); *B60W 10/26* (2013.01); *B60W 20/14* (2016.01); *B60W 30/18127* (2013.01); *B60W 30/18136* (2013.01); *B60W 2510/0604* (2013.01); *B60W 2510/0638* (2013.01); *Y02T 10/6286* (2013.01)

(58) Field of Classification Search
CPC ..... B60W 20/00; B60W 10/06; B60W 10/18
See application file for complete search history.

(56) References Cited

U.S. PATENT DOCUMENTS

| 6,140,780 A | 10/2000 | Oshima et al. |
| 2004/0118367 A1 | 6/2004 | Ezaki et al. |
| 2007/0018608 A1 | 1/2007 | Okumura |
| 2007/0209619 A1* | 9/2007 | Leone .................. B60W 10/06 123/90.12 |
| 2012/0132163 A1 | 5/2012 | Shoji et al. |
| 2012/0226402 A1* | 9/2012 | Minamiura ............... B60T 1/10 701/22 |
| 2013/0306012 A1 | 11/2013 | Hamamoto et al. |
| 2014/0251243 A1* | 9/2014 | Nakamura .......... F01L 13/0015 123/90.15 |

FOREIGN PATENT DOCUMENTS

| JP | 09-242519 A | 9/1997 |
| JP | H1193724 A | 4/1999 |
| JP | 2002-061522 A | 2/2002 |
| JP | 2004-183610 A | 7/2004 |
| JP | 2005-137091 A | 5/2005 |
| JP | 2008-025550 A | 2/2008 |

(Continued)

*Primary Examiner* — Yonel Beaulieu
*Assistant Examiner* — Martin Weeks
(74) *Attorney, Agent, or Firm* — Dinsmore & Shohl LLP

(57) ABSTRACT

A regenerative control unit performs regenerative control to perform electric power regeneration. When regenerative control is performed, a valve control unit controls a VVL device to limit an upper limit of at least one of an amount of lifting an intake valve and a working angle on the intake valve to be lower than when regenerative control is not performed. As a result, a hybrid vehicle allowing a power storage device to be charged in regenerative braking, can ensure engine braking force and also minimize degradation of the power storage device.

20 Claims, 14 Drawing Sheets

(56) References Cited

FOREIGN PATENT DOCUMENTS

| JP | 2008-114709 A | 5/2008 |
|----|---------------|--------|
| JP | 2008-290533 A | 12/2008 |
| JP | 2011-057073 A | 3/2011 |
| JP | 2012-067631 A | 4/2012 |
| JP | 2012-117376 A | 6/2012 |
| JP | 2013-053610 A | 3/2013 |
| WO | 2012105509 A1 | 8/2012 |

* cited by examiner

DEVICE AND METHOD FOR CONTROLLING A HYBRID VEHICLE

This nonprovisional application is based on Japanese Patent Application No. 2013-194369 filed on Sep. 19, 2013, with the Japan Patent Office, the entire contents of which are hereby incorporated by reference.

BACKGROUND OF THE INVENTION

1. Field of the Invention

The present invention relates generally to a device and method for controlling a hybrid vehicle and more specifically to controlling a hybrid vehicle including an internal combustion engine.

2. Description of the Background Art

A hybrid vehicle including an internal combustion engine and an electric motor is generally known. The hybrid vehicle may have the electric motor operated to perform regenerative braking to recover energy. In regenerative braking, when braking force is requested, the electric motor converts the hybrid vehicle's kinetic energy into electrical energy to thus generate braking force and also charge a rechargeable battery.

For example, Japanese Patent Laying-Open No. 2005-137091 discloses a hybrid vehicle capable of regenerative braking. The hybrid vehicle includes a rechargeable battery to store electric power generated through regenerative braking and refers to the rechargeable battery's degradation degree to limit electric power charged in regenerative braking. This allows the rechargeable battery to have an extended lifetime.

Furthermore, a hybrid vehicle may have mounted therein an internal combustion engine having a variable valve actuation device for varying an actuation characteristic of an intake valve of the internal combustion engine. Some variable valve actuation device is configured to vary at least one of an amount of lifting an intake valve and a working angle on the intake valve (see Japanese Patent Laying-Open Nos. 2004-183610, 2013-053610, 2008-025550, 2012-117376, and 09-242519, for example). The variable valve actuation device allows the internal combustion engine to exhibit a modified operational characteristic.

A hybrid vehicle may implement requested engine braking force by braking force of regenerative braking. In that case, ensuring that the requested engine braking force is implemented is important, and accordingly, if regenerative braking generates electric power exceeding that which the rechargeable battery can accept, regenerative braking must be performed, and it may be difficult to prevent the rechargeable battery from degrading.

SUMMARY OF THE INVENTION

The present invention has been made to address the above issue, and it contemplates a hybrid vehicle allowing a power storage device to be charged in regenerative braking, that can minimize the power storage device's degradation while ensuring engine braking force.

According to the present invention, a hybrid vehicle includes an internal combustion engine and a rotating electric machine. The internal combustion engine has a variable valve actuation device for varying an actuation characteristic of an intake valve. The rotating electric machine generates braking force for the hybrid vehicle through performing electric power regeneration. A control device for the hybrid vehicle includes a regenerative control unit and a valve control unit. The regenerative control unit performs regenerative control to perform the electric power regeneration. The valve control unit controls the variable valve actuation device to limit an upper limit of at least one of an amount of lifting the intake valve and a working angle on the intake valve that is applied when the regenerative control is performed to be lower than an upper limit of at least one of the amount and the angle that is applied when the regenerative control is not performed.

Preferably, when the regenerative control is performed, the valve control unit controls the variable valve actuation device to limit the upper limit of the at least one of the amount of lifting and the working angle, whereas when the regenerative control is not performed, the valve control unit controls the variable valve actuation device to determine at least one of the amount of lifting and the working angle, depending on the rotational speed and load of the internal combustion engine.

Preferably, the hybrid vehicle further includes a power storage device to store electric power for driving the rotating electric machine, and when the regenerative control is not performed and electric power discharged from the power storage device is limited, the valve control unit limits the upper limit of at least one of the amount of lifting and the working angle to be lower than an upper limit of at least one of the amount and the angle that is applied when the regenerative control is not performed and the electric power discharged from the power storage device is not limited.

Preferably, the variable valve actuation device is configured to be capable of switching the actuation characteristic of the intake valve to any one of a first characteristic and a second characteristic allowing at least one of the amount of lifting and the working angle to be larger than when the actuation characteristic is the first characteristic, and when the regenerative control is performed, the valve control unit controls the variable valve actuation device to allow the actuation characteristic of the intake valve to be the first characteristic, whereas when the regenerative control is not performed, the valve control unit controls the variable valve actuation device to allow the actuation characteristic of the intake valve to be one of the first and second characteristics depending on the rotational speed and load of the internal combustion engine.

Preferably, the variable valve actuation device is configured to be capable of switching the actuation characteristic of the intake valve to any one of a first characteristic, a second characteristic allowing at least one of the amount of lifting and the working angle to be larger than when the actuation characteristic is the first characteristic, and a third characteristic allowing at least one of the amount of lifting and the working angle to be larger than when the actuation characteristic is the second characteristic, and when the regenerative control is performed, the valve control unit controls the variable valve actuation device to allow the actuation characteristic of the intake valve to be the first characteristic, whereas when the regenerative control is not performed, the valve control unit controls the variable valve actuation device to allow the actuation characteristic of the intake valve to be one of the first to third characteristics depending on the rotational speed and load of the internal combustion engine.

Preferably, the hybrid vehicle further includes a power storage device to store electric power for driving the rotating electric machine, and when the regenerative control is not performed and electric power discharged from the power storage device is limited, the valve control unit controls the variable valve actuation device to allow the actuation characteristic of the intake valve to be the first characteristic.

Furthermore, according to the present invention, a hybrid vehicle includes an internal combustion engine and a rotating electric machine. The internal combustion engine has a variable valve actuation device for varying an actuation characteristic of an intake valve. The rotating electric machine generates braking force for the hybrid vehicle through performing electric power regeneration. A method for controlling the hybrid vehicle includes the steps of: performing regenerative control to perform the electric power regeneration; and controlling the variable valve actuation device to limit an upper limit of at least one of an amount of lifting the intake valve and a working angle on the intake valve that is applied when the regenerative control is performed to be lower than an upper limit of at least one of the amount and the angle that is applied when the regenerative control is not performed.

Thus in the present invention, when regenerative control is performed, at least one of the amount of lift and the working angle is reduced and accordingly the internal combustion engine has an increased pumping loss. Thus the internal combustion engine's braking force can be increased and braking force via regenerative braking can be reduced to limit an amount of electric power that is charged to the power storage device to be smaller than acceptable electric power. The present invention can thus provide a hybrid vehicle allowing a power storage device to be charged in regenerative braking, that can minimize the power storage device's degradation while ensuring engine braking force.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe the present invention in embodiments more specifically. Note that, in the figures, identical or corresponding components are identically denoted and will not be described repeatedly.

Figure 1:
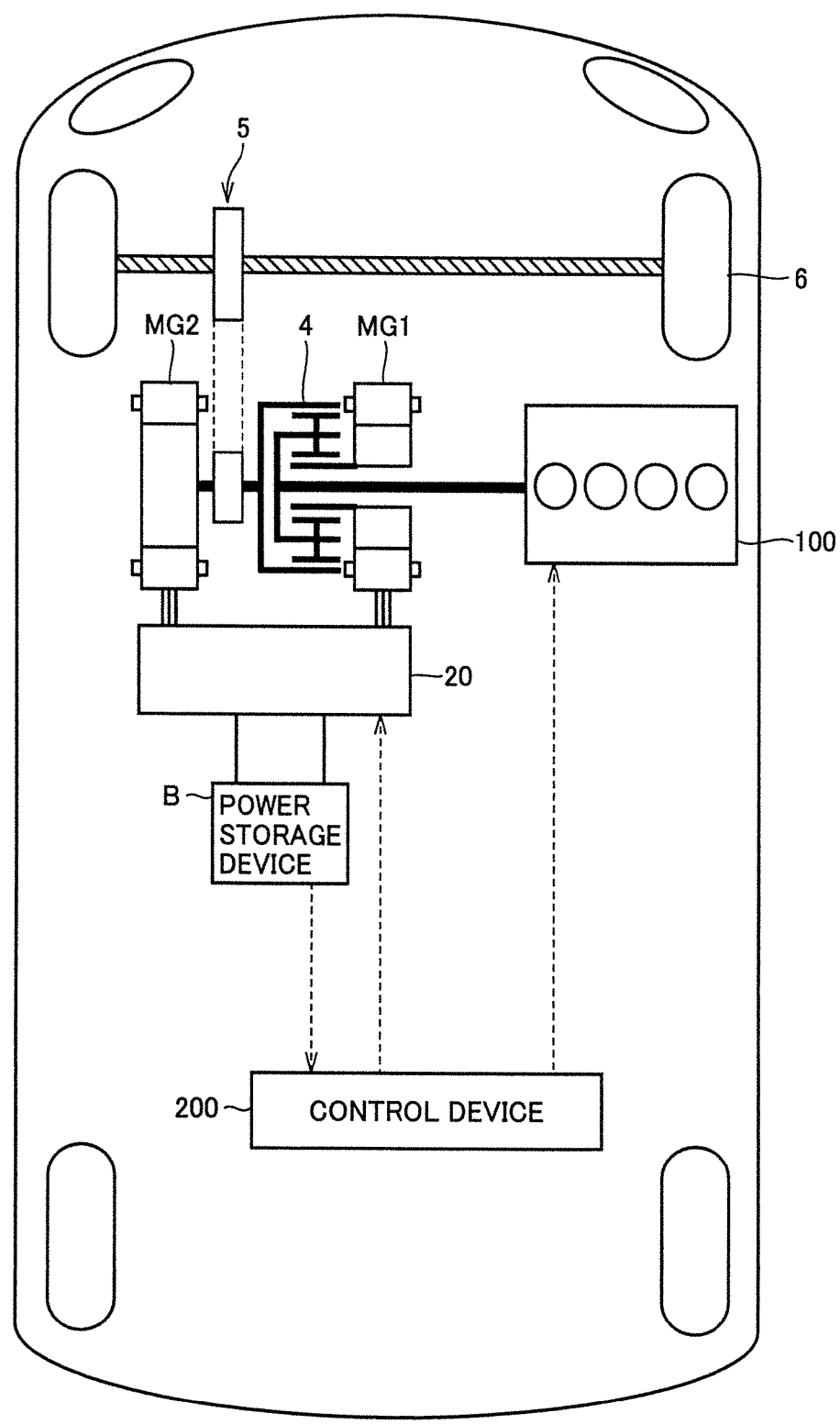
FIG. 1 is a block diagram generally showing a configuration of a hybrid vehicle having a control device applied thereto according to an embodiment of the present invention.

FIG. 1 is a block diagram generally showing a configuration of a hybrid vehicle having a control device applied thereto according to an embodiment of the present invention. With reference to FIG. 1, a hybrid vehicle 1 includes an engine 100, motor generators MG1 and MG2, a power split device 4, a speed reducer 5, a driving wheel 6, a power storage device B, a power control unit (PCU) 20, and a controller or control device 200

Hybrid vehicle 1 travels as driven by a driving force output from at least one of engine 100 and motor generator MG2. Engine 100 generates driving force which is in turn split by power split device 4 for two paths. One path transmits driving force via speed reducer 5 to driving wheel 6, and the other path transmits driving force to motor generator MG1.

Power storage device B is a chargeably and dischargeably configured electric power storage element. Power storage device B for example includes a rechargeable battery such as a lithium ion battery, a nickel metal hydride battery or a lead acid battery, or a cell of a power storage element such as an electric double layer capacitor. Power storage device B senses power storage device B's temperature, current and voltage and outputs the sensed values to control device 200. Control device 200 receives the sensed values from power storage device B and uses the values to calculate a state of charge (SOC) of power storage device B.

Power storage device B is connected to PCU 20 to drive motor generators MG1 and MG2. Power storage device B supplies PCU 20 with electric power for generating driving force to drive hybrid vehicle 1. Furthermore, power storage device B stores electric power generated by motor generators MG1, MG2. Power storage device B outputs 200 V for example.

PCU 20 receives direct current (dc) electric power from power storage device B and converts the received dc electric power into alternating current (ac) electric power to drive motor generators MG1 and MG2. PCU 20 also receives ac electric power generated by motor generators MG1 and MG2 and converts the received ac electric power into dc electric power to charge power storage device B therewith.

Control device 200 calculates travelling power based on a signal indicative of an amount by which the accelerator pedal is operated and the vehicle's travelling state, and control device 200 controls force, as based on the calculated travelling power, to drive engine 100 and motor generator MG2. Furthermore, control device 200 controls the travelling mode of hybrid vehicle 1, based on the travelling power. The travelling mode includes an "EV mode" allowing the vehicle to travel with engine 100 stopped and motor generator MG2 serving as a source of motive power, and an "HV mode" allowing the vehicle to travel with engine 100 in operation.

Control device 200 refers to an amount of a state of power storage device B to limit electric power that is charged/discharged to/from power storage device B to minimize power storage device B's degradation. The amount of the state of power storage device B for example includes the temperature, SOC and the like of power storage device B. By way of example, control device 200 limits electric power charged/discharged to/from power storage device B when power storage device B has low temperature.

Figure 2:
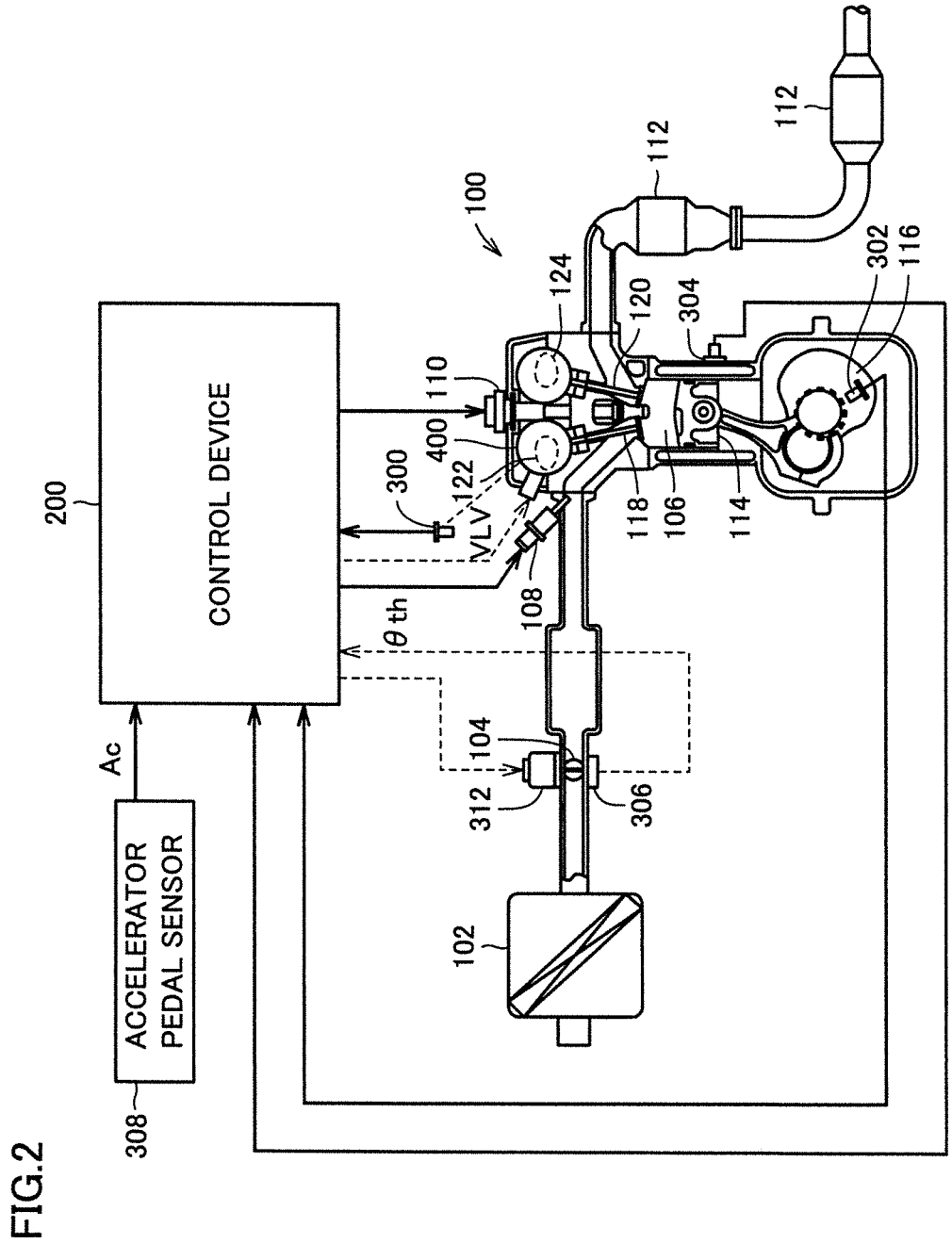
FIG. 2 shows a configuration of an engine shown in FIG. 1.

FIG. 2 shows a configuration of engine 100 shown in FIG. 1. With reference to FIG. 2, engine 100 takes in air from via an air cleaner 102. How much amount of air is taken in is adjusted by a throttle valve 104. Throttle valve 104 is an electronically controlled throttle valve driven by a throttle motor 312.

An injector 108 injects fuel towards an air intake port. At the air intake port, the fuel is mixed with air and thus introduced into a cylinder 106.

While the present embodiment will be described with engine 10 implemented in the form of a port injected engine with injector 108 having an injection port provided in the air intake port, port injecting injector 108 and in addition thereto a direct injection injector may also be provided to inject fuel directly into cylinder 106. The direct injection injector may alone be provided.

Cylinder 106 receives the air-fuel mixture, which is ignited by an ignition plug 110 and thus combusted. The combusted air-fuel mixture, or exhaust gas, is purified by a three-way catalyst 112 and subsequently discharged outside the vehicle. As the air-fuel mixture is combusted, a piston 114 is pushed down and a crankshaft 116 thus rotates.

Cylinder 106 has a head or top portion provided with an intake valve 118 and an exhaust valve 120. When and in what amount cylinder 106 receives air is controlled by intake valve 118. When and in what amount cylinder 106 exhausts exhaust gas is controlled by exhaust valve 120. Intake valve 118 is driven by a cam 122. Exhaust valve 120 is driven by a cam 124.

Intake valve 118 is lifted in an amount and worked by a working angle, as controlled by a variable valve lift (VVL) device 400, as will be described hereinafter more specifically. Exhaust valve 120 may also be similarly lifted and worked. Furthermore, a variable valve timing (VVT) device may be combined with VVL device 400 to control timing when the valve should be opened/closed.

Control device 200 controls a throttle angle θth, timing when to provide ignition, timing when to inject fuel, the amount of fuel to be injected, the intake valve's operating condition (timing when to open/close the valve, the amount of lift, the working angle, and the like) to allow engine 100 to achieve a driving state as desired. Control device 200 receives signals from a cam angle sensor 300, a crank angle sensor 302, a knock sensor 304, a throttle angle sensor 306, and an accelerator pedal sensor 308.

Cam angle sensor 300 outputs a signal indicating a cam's position. Crank angle sensor 302 outputs a signal indicating the rotational speed of crankshaft 116 (or the engine's rotational speed) and the angle of rotation of crankshaft 116. Knock sensor 304 outputs a signal indicating how engine 100 vibrates in intensity. Throttle angle sensor 306 outputs a signal indicating throttle angle θth.

Accelerator pedal sensor 308 senses by how much amount the driver operates the accelerator pedal, and accelerator pedal sensor 308 outputs to control device 200 a signal Ac indicating the sensed amount. Control device 200 receives signal Ac from accelerator pedal sensor 308 and therefrom calculates how much acceleration/deceleration the driver requests. Control device 200 controls force to drive engine 100 and motor generator MG2 to satisfy the requested acceleration/deceleration as calculated. When the amount by which the accelerator pedal is operated is zero, control device 200 controls engine 100 and motor generator MG2 to output braking force corresponding to engine braking.

Figure 3:
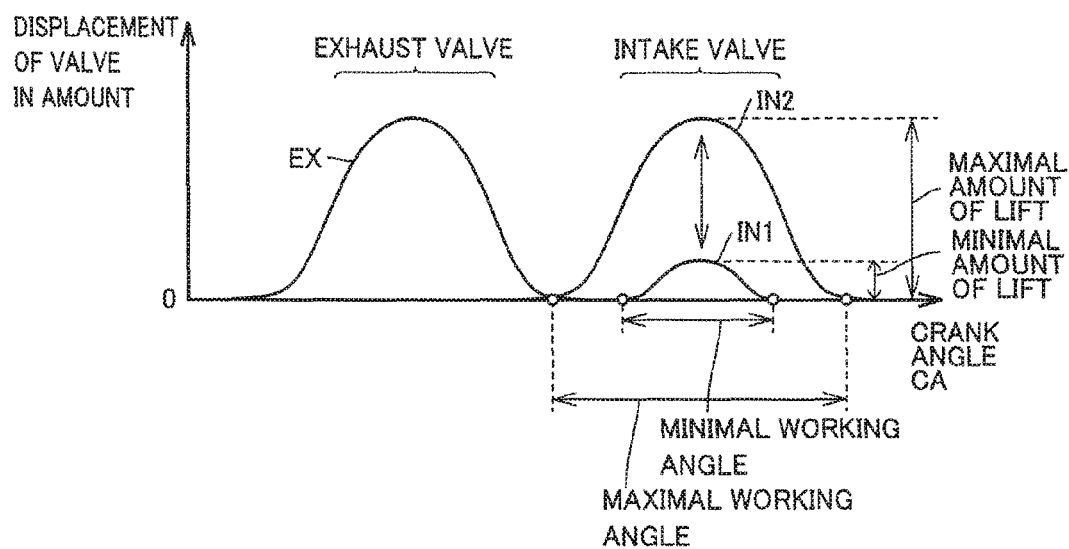
FIG. 3 represents a relationship between valve lift and crank angle, as implemented in a VVL device.

FIG. 3 represents a relationship, as implemented in VVL device 400, between a valve's displacement in amount and crank angle. With reference to FIG. 3, for the exhaust stroke, exhaust valve 120 opens and closes, and for the intake stroke, intake valve 118 opens and closes. Exhaust valve 120 displaces in an amount represented by a waveform EX, and intake valve 118 displaces in amounts represented by waveforms IN1 and IN2.

The valve's displacement in amount indicates an amount by which intake valve 118 is displaced from its closed position. The amount of lift indicates an amount by which intake valve 118 is displaced when the valve peaks in how much in degree it is opened. The working angle is a crank angle assumed after intake valve 118 is opened before it is closed.

Intake valve 118 has an actuation characteristic varied by VVL device 400 between waveforms IN1 and IN2. Waveform IN1 corresponds to a minimal amount of lift and a minimal working angle. Waveform IN2 corresponds to a maximal amount of lift and a maximal working angle. In VVL device 400, a larger amount of lift is accompanied by a larger working angle.

Figure 4:
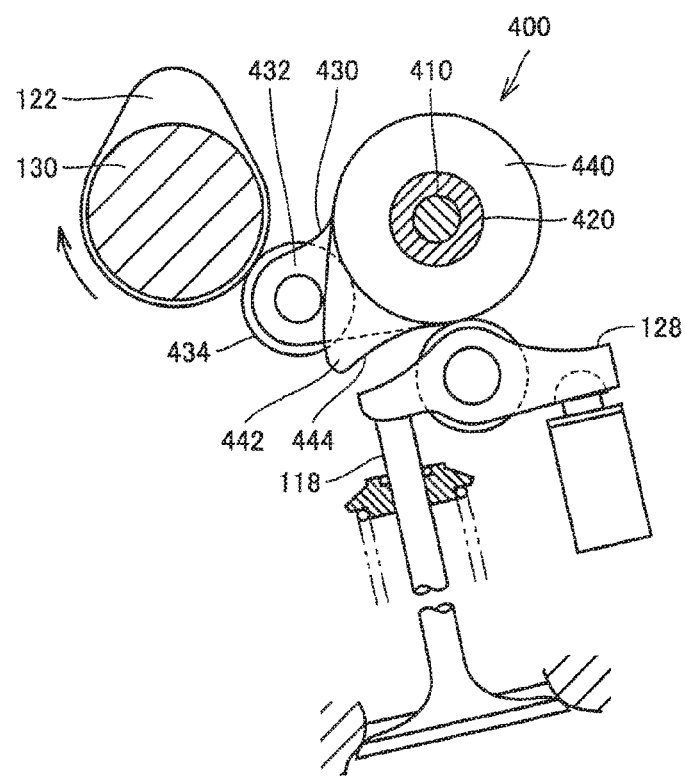
FIG. 4 is a front view of a VVL device that controls an amount of lifting an intake valve and a working angle on the intake valve.

FIG. 4 is a front view of VVL device 400 serving as an exemplary device that controls an amount of lifting intake valve 118 and a working angle on intake valve 118. With reference to FIG. 4, VVL device 400 includes a driving shaft 410 extending in one direction, a support pipe 420 that covers driving shaft 410 circumferentially, and an input arm 430 and a rocking cam 440 disposed in alignment on an outer circumferential surface of support pipe 420 in a direction along the axis of driving shaft 410. Driving shaft 410 has a tip with an actuator (not shown) connected thereto to cause driving shaft 410 to provide rectilinear motion.

VVL device 400 is provided with a single input arm 430 associated with a single cam 122 provided for each cylinder. Input arm 430 has opposite sides provided with two rocking cams 440 associated with a pair of intake valves 118, respectively, provided for each cylinder.

Support pipe 420 is formed in a hollowed cylinder and disposed in parallel to a cam shaft 130. Support pipe 420 is secured to a cylinder head and thus prevented from axially moving or rotating.

Support pipe 420 internally receives driving shaft 410 to allow driving shaft 410 to slide axially. Support pipe 420 has an outer circumferential surface provided thereon with input arm 430 and two rocking cams 440 to be rockable about an axial core of driving shaft 410 and also prevented from moving in a direction along the axis of driving shaft 410.

Input arm 430 has an arm portion 432 projecting in a direction away from the outer circumferential surface of support pipe 420, and a roller portion 434 rotatably connected to a tip of arm portion 432. Input arm 430 is provided to allow roller portion 434 to be disposed at a position allowing roller portion 434 to abut against cam 122.

Rocking cam 440 has a nose portion 442 in a generally triangular form projecting in a direction away from the outer circumferential surface of support pipe 420. Nose portion 442 has one side having a recessed, curved cam surface 444. Intake valve 118 is provided with a valve spring, which is biased to apply force to in turn press against cam surface 444 a roller rotatably attached to a rocker arm 128.

Input arm 430 and rocking cam 440 rock together about the axial core of driving shaft 410. Accordingly, as cam shaft 130 rotates, input arm 430 that abuts against cam 122 rocks, and as input arm 430 thus moves, rocking cam 440 also rocks. This motion of rocking cam 440 is transmitted via rocker arm 128 to intake valve 118 to thus open/close intake valve 118.

VVL device 400 further includes a device around the axial core of support pipe 420 to vary a relative phase difference between input arm 430 and rocking cam 440. The device that varies the relative phase difference allows intake valve 118 to be lifted in an amount and worked by a working angle, as modified as appropriate.

More specifically, input arm 430 and rocking cam 440 with an increased relative phase difference allow rocker arm 128 to have a rocking angle increased relative to that of input arm 430 and rocking cam 440 and intake valve 118 to be lifted in an increased amount and worked by an increased working angle.

In contrast, input arm 430 and rocking cam 440 with a reduced relative phase difference allow rocker arm 128 to have a rocking angle reduced relative to that of input arm 430 and rocking cam 440 and intake valve 118 to be lifted in a reduced amount and worked by a reduced working angle.

Figure 5:
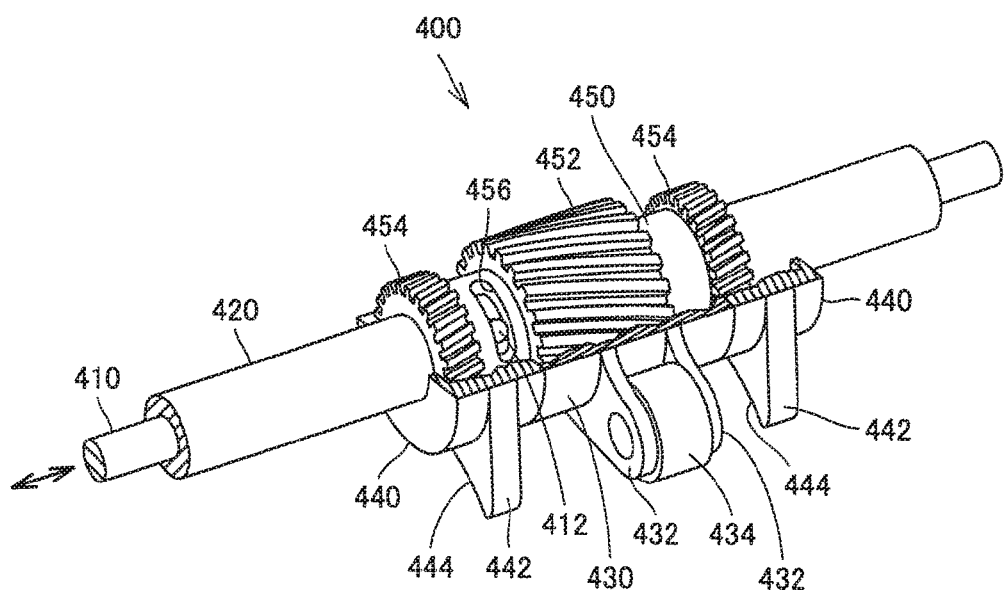
FIG. 5 is a partial perspective view of the VVL device.

FIG. 5 is a partial perspective view of VVL device 400. FIG. 5 shows VVL device 400 partially exploded to help to clearly understand its internal structure.

With reference to FIG. 5, input arm 430 and two rocking cams 440, and an outer circumferential surface of support pipe 420 define a space therebetween, and in that space, a slider gear 450 is accommodated that is supported to be rotatable relative to support pipe 420 and also axially slidable. Slider gear 450 is provided slidably on support pipe 420 axially.

Slider gear 450 as seen axially has a center provided with a helically right handed splined helical gear 452. Slider gear 450 as seen axially also has opposite sides provided with helically left handed splined helical gears 454s, respectively, with helical gear 452 posed therebetween.

An internal circumferential surface of input arm 430 and two rocking cams 440 that defines the space that has slider gear 450 accommodated therein, is helically splined to correspond to helical gears 452 and 454. More specifically, input arm 430 is helically right handed splined to mesh with helical gear 452. Furthermore, rocking cam 440 is helically left handed splined to mesh with helical gear 454.

Slider gear 450 is provided with an elongate hole 456 located between one helical gear 454 and helical gear 452 and extending circumferentially. Furthermore, although not shown, support pipe 420 is provided with an elongate hole extending axially and overlapping a portion of elongate hole 456. Driving shaft 410, inserted in support pipe 420, is integrally provided with a locking pin 412 to project through those portions of elongate hole 456 and the unshown elongate hole which overlap each other.

Driving shaft 410 is coupled with an actuator (not shown), and when the actuator is operated, driving shaft 410 moves in its axial direction, and accordingly, slider gear 450 is pushed by locking pin 412 and helical gears 452 and 454 move in a direction along the axis of driving shaft 410 concurrently. While helical gears 452 and 454 are thus moved, input arm 430 and rocking cam 440 splined and thus engaged therewith do not move in the axial direction. Accordingly, input arm 430 and rocking cam 440, helically splined and thus meshed, pivot about the axial core of driving shaft 410.

Note that input arm 430 and rocking cam 440 are helically splined in opposite directions, respectively. Accordingly, input arm 430 and rocking cam 440 pivot in opposite directions, respectively. This allows input arm 430 and rocking cam 440 to have a relative phase difference varied to allow intake valve 118 to be lifted in a varying amount and worked by a varying working angle, as has been previously described. Note that the VVL device is not limited to such a form as described above. For example, the VVL device may be a VVL device which electrically drives the valve, a VVL device which hydraulically drives the valve, or the like.

Control device 200 controls by how much amount the actuator that causes driving shaft 410 to move in rectilinear motion should be operated to control the amount of lifting intake valve 118 and the working angle on intake valve 118.

Figure 6:
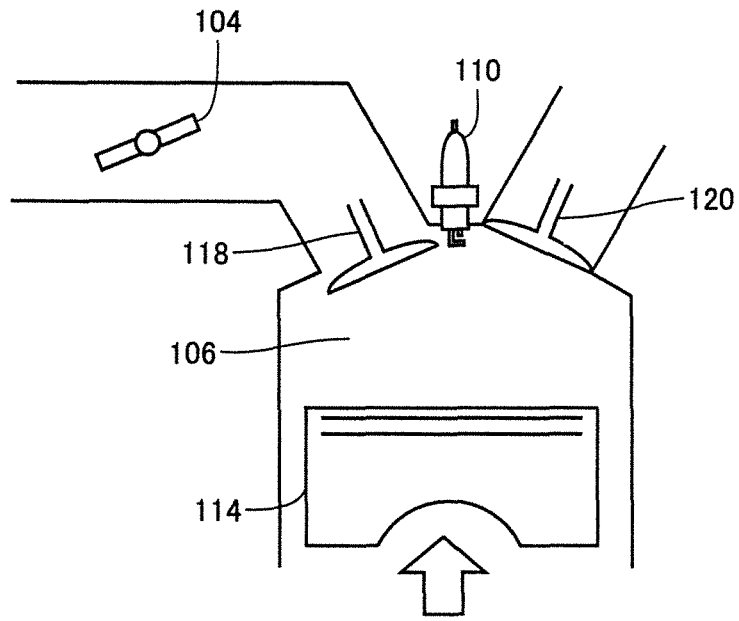
FIG. 6 illustrates an operation provided when the intake valve is lifted in a large amount and worked by a large working angle.
Figure 7:
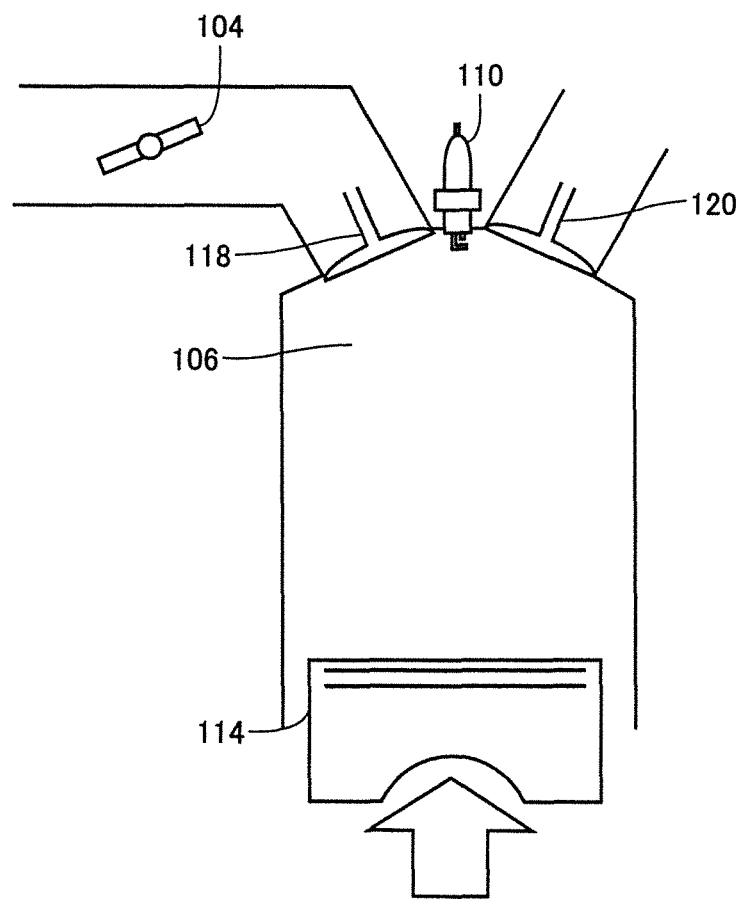
FIG. 7 illustrates an operation provided when the intake valve is lifted in a small amount and worked by a small working angle.

FIG. 6 illustrates an operation provided when intake valve 118 is lifted in a large amount and worked by a large working angle. FIG. 7 illustrates an operation provided when intake valve 118 is lifted in a small amount and worked by a small working angle. With reference to FIGS. 6 and 7, when intake valve 118 is lifted in a large amount and worked by a large working angle, intake valve 118 is timed to close late, and accordingly, engine 100 is operated in the Atkinson cycle. More specifically, the intake stroke is performed to allow cylinder 106 to take in air, which is partially returned outside cylinder 106, and accordingly, the compression stroke is performed with the air compressed by a reduced force, i.e., with a reduced compressive reaction. This allows the engine to be started with reduced vibration. However, a reduced compression ratio is provided resulting in poor ignitability.

In contrast, when intake valve 118 is lifted in a small amount and worked by a small working angle, intake valve 118 is timed to close early, and accordingly, a raised compression ratio is provided. This can improve ignitability for low temperature and also improve engine torque response. However, an increased compressive reaction is provided resulting in the engine vibrating more when it starts. Furthermore, when intake valve 118 is lifted in a small amount and worked by a small working angle, an increased pumping loss is caused and engine braking is accordingly increased, as will be described hereinafter.

Figure 8:
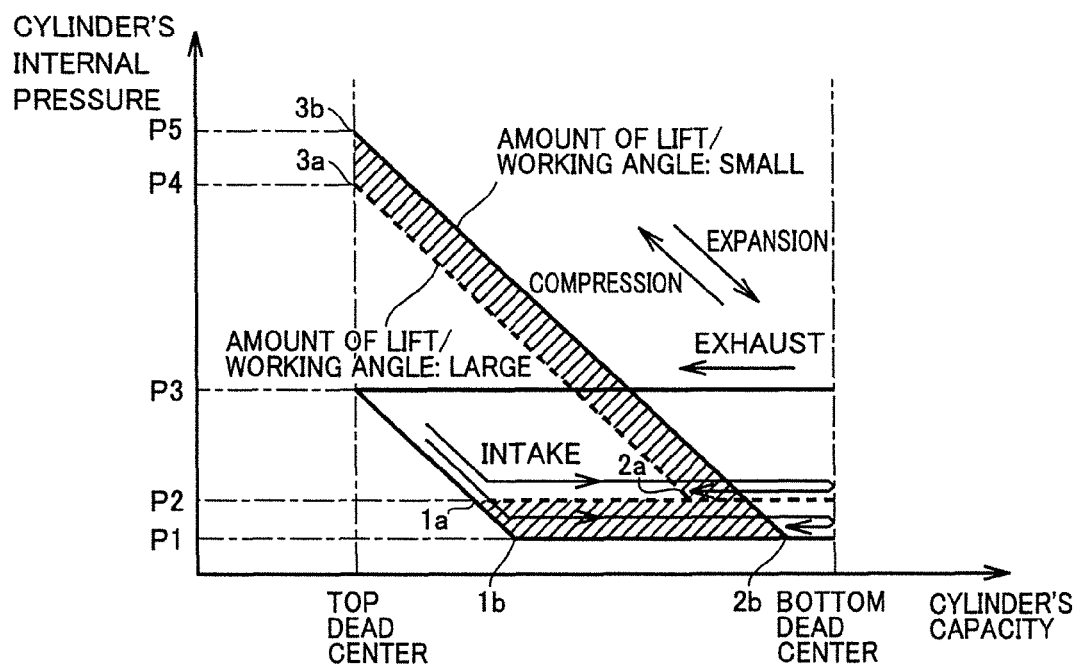
FIG. 8 is a PV diagram representing the engine's operation.

FIG. 8 is a PV diagram representing an operation of engine 100. In FIG. 8, the axis of abscissa represents the cylinder's capacity and the axis of ordinate represents the cylinder's internal pressure. In FIG. 8, a solid line corresponds to a small amount of lift and a small working angle, and a broken line corresponds to a large amount of lift and a large working angle. Furthermore, FIG. 8 represents a state in which engine 100 does not provide combustion, i.e., engine 100 causes engine braking. At the time, throttle valve 104 is closed and no fuel is injected for the sake of illustration.

With reference to FIG. 8 together with FIG. 6 and FIG. 7, for a large amount of lift and a large working angle, at the intake stroke when piston 114 starts to descend from the top dead center, the cylinder has an internal pressure gradually decreasing from pressure P3. When the operating point reaches to a position 1a, intake valve 118 opens and the cylinder's internal pressure is held at pressure P2. Piston 114 descends to the bottom dead center and then ascends, and once the operating point has reached a position 2a, intake valve 118 closes. With intake valve 118 closed, the cylinder's internal pressure rises as piston 114 ascends (i.e., the compression stroke). Piston 114 ascends to the top dead center, and once the operating point has reached a position 3a, the cylinder's internal pressure attains pressure P4. Thereafter, piston 114 descends and the expansion stroke is performed, and the exhaust stroke is subsequently performed.

For a small amount of lift and a small working angle, in contrast, intake valve 118 is timed to open late. Accordingly, for a position 1b that indicates a point at which intake valve 118 opens, the cylinder internally has pressure P1 lower than pressure P2. Accordingly, an intake stroke with a small amount of lift and a small working angle requires larger force to cause piston 114 to descend and thus causes a larger pumping loss than that with a large amount of lift and a large working angle.

Furthermore, for a small amount of lift and a small working angle, intake valve 118 is timed to close early, and compression starts at a position 2b. Accordingly, during the compression stroke when piston 114 reaches the top dead center, i.e., at a position 3b, the cylinder internally has pressure P5 larger than pressure P4. Accordingly, a compression stroke with a small amount of lift and a small working angle results in a larger compressive reaction and hence a larger pumping loss than that with a large amount of lift and a large working angle.

Thus a small amount of lift and a small working angle result in a larger pumping loss than a large amount of lift and a large working angle. How much pumping loss is increased is represented in FIG. 8 as a hatched area.

In the above configuration, requested engine braking force may be implemented by braking force of regenerative braking. In that case, ensuring that the requested engine braking force is implemented is important, and accordingly, if regenerative braking generates electric power exceeding that which power storage device B can accept, regenerative braking must be performed, and it may be difficult to prevent power storage device B from degrading.

In the present embodiment, when regenerative control is performed, the intake valve is controlled by controlling VVL device 400 to limit an upper limit of at least one of an amount of lifting intake valve 118 and a working angle on intake valve 118 to be lower than when regenerative control is not performed. How the valve is controlled will more specifically be described hereinafter.

Figure 9:
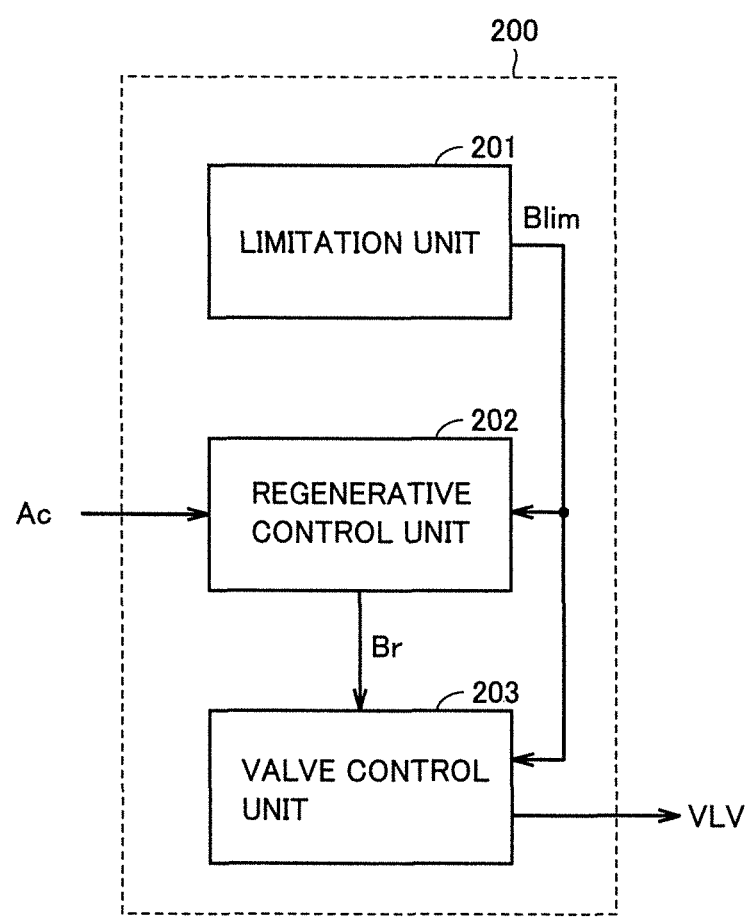
FIG. 9 is a functional block diagram for illustrating how the FIG. 1 control device controls the intake valve.

FIG. 9 is a functional block diagram for illustrating how the FIG. 1 control device 200 controls the intake valve. Each functional block shown in FIG. 9 is implemented by processing done by control device 200 via hardware or software.

With reference to FIG. 9 together with FIG. 2, control device 200 includes a limitation unit 201, a regenerative control unit 202, and a valve control unit 203.

Limitation unit 201 refers to an amount of a state of power storage device B to limit electric power discharged from power storage device B. More specifically, limitation unit 201 limits an input/output of power storage device B more than a normal operating range does to minimize the battery's degradation. Limitation unit 201 outputs to regenerative control unit 202 and valve control unit 203 a signal Blim indicating that the electric power discharged from power storage device B is limited.

Regenerative control unit 202 receives signal Ac from accelerator pedal sensor 308. Regenerative control unit 202 receives signal Blim from limitation unit 201. When regenerative control unit 202 receives signal Ac indicating that the amount by which accelerator pedal sensor 308 is operated is zero, regenerative control unit 202 performs regenerative control to control engine 100 and motor generator MG2 to output braking force corresponding to engine braking. When regenerative control unit 202 receives signal Blim indicating that the electric power discharged from power storage device B is limited, regenerative control unit 202 limits regenerative braking force of motor generator MG2 to decrease electric power charged to power storage device B. Regenerative control unit 202 outputs to valve control unit 203 a signal Br indicating whether/how regenerative control is performed.

Valve control unit 203 receives signal Blim from limitation unit 201. Valve control unit 203 receives signal Br from regenerative control unit 202. When valve control unit 203 receives signal Br indicating that regenerative control is currently performed or signal Blim indicating that the electric power discharged from power storage device B is limited, valve control unit 203 limits an upper limit of at least one of the amount of lifting intake valve 118 and the working angle on intake valve 118. By way of example, valve control unit 203 may control VVL device 400 to minimize the amount of lifting intake valve 118 and the working angle on intake valve 118. This allows engine 100 to generate increased engine braking force to ensure sufficient engine braking force.

In contrast, when valve control unit 203 does not receive signal Br indicating that regenerative control is currently performed (i.e. when power running control of motor generator MG2 is performed) and valve control unit 203 does not receive signal Blim indicating that the electric power discharged from power storage device B is limited, valve control unit 203 controls VVL device 400 to determine at least one of the amount of the lifting and the working angle, depending on engine 100's rotational speed and load. When regenerative control is not performed, the amount of the lifting and the working angle are determined for example in a method, as will be described hereinafter.

Figure 10:
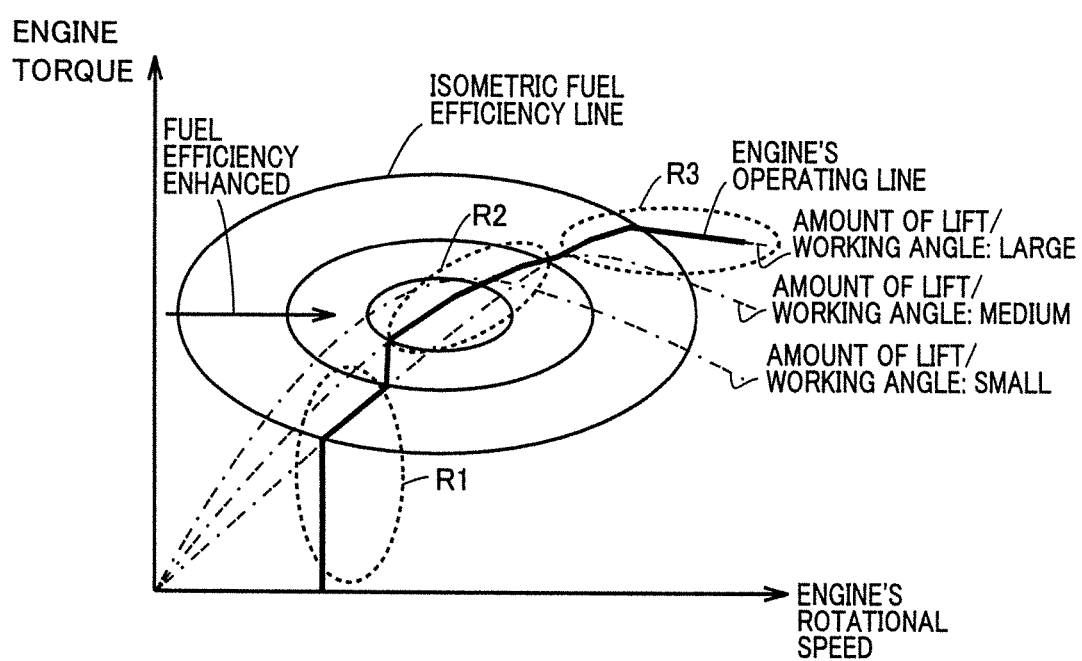
FIG. 10 represents the engine's operating line.

FIG. 10 shows the engine's operating line. In FIG. 10, the axis of abscissa represents the engine's rotational speed and the axis of ordinate represents engine torque. Note that in FIG. 10, alternate long and short dashed lines indicate torque characteristics corresponding to different amounts of lifting and different working angles (i.e., large, medium, small). Furthermore, in FIG. 10, a circle indicated by a solid line indicates an isometric fuel efficiency line. The isometric fuel efficiency line indicates connected points equal in fuel consumption, and a point closer to the center of the circle corresponds to more enhanced fuel efficiency. Engine 100 is basically operated on an engine operating line indicated in FIG. 10 by a solid line, for the sake of illustration. Note that FIG. 10 indicates an operating line of the engine, as presented when a VVL device is used that allows intake valve 118 to have an actuation characteristic varied between three levels.

Herein, a range R1 indicates a low rotational speed range, for which reducing a physical impact caused when the engine starts is important. Furthermore, exhaust gas recirculation (EGR) is ceased and the Atkinson cycle is applied for enhanced fuel efficiency. Accordingly, intake valve 118 is lifted in an increased amount and worked by an increased working angle. A range R2 indicates a medium rotational speed range, for which the EGR is applied to introduce exhaust gas in an increased amount for enhanced fuel efficiency. Accordingly, a medium amount of lift and a medium working angle are selected.

In other words, when intake valve 118 is lifted in a large amount and worked by a large working angle, enhancing fuel efficiency via the Atkinson cycle, rather than via the EGR, is prioritized. In contrast, when a medium amount of lift and a medium working angle are selected, enhancing fuel efficiency via the EGR, rather than via the Atkinson cycle, is prioritized.

A range R3 indicates a high rotational speed range, for which intake inertia is exploited to introduce a large amount of air into the cylinder to provide an increased actual compression ratio for better output performance. Accordingly, intake valve 118 is lifted in an increased amount and worked by an increased working angle.

Furthermore, when engine 100 is operated in the low rotational speed range at a large load; engine 100 is started at cryogenic temperature; or a catalyst is warmed up, intake valve 118 is lifted in a decreased amount and worked by a decreased working angle. Thus, when regenerative control is not performed, an amount of lift and a working angle are determined depending on how engine 100 is operated.

Figure 11:
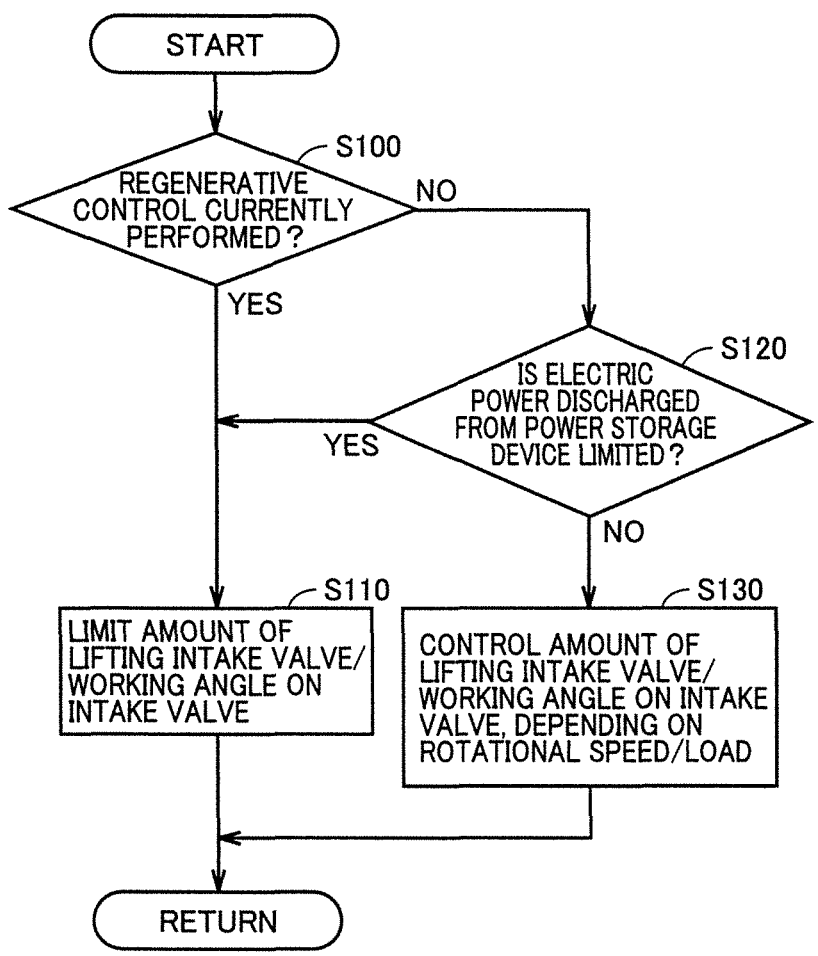
FIG. 11 is a flowchart for illustrating a process done by the FIG. 1 control device to control the intake valve.

FIG. 11 is a flowchart for illustrating a process done by the FIG. 1 control device 200 to control the intake valve. The FIG. 11 flowchart is implemented by periodically executing a program previously stored in control device 200. Alternatively, some steps may be performed via constructed dedicated hardware (or electronic circuitry) or the controller.

With reference to FIG. 11, control device 200 in Step (S) 100 determines whether regenerative control is currently performed. If so (YES in S100), control device 200 controls VVL device 400 to limit the upper limit of the amount of lifting intake valve 118 and working angle on intake valve 118 (S110). By way of example, when regenerative control is currently performed, control device 200 may control VVL device 400 to minimize the amount of lifting intake valve 118 and the working angle on intake valve 118.

If control device 200 determines that regenerative control is currently not performed (NO in S100), control device 200 determines whether the electric power discharged from power storage device B is limited (S120). If so (YES in S120), the control proceeds to S110.

If not (NO in S120), control device 200 controls VVL device 400 to determine at least one of the amount of lift and the working angle, depending on engine 100's rotational speed and load (S130).

Figure 12:
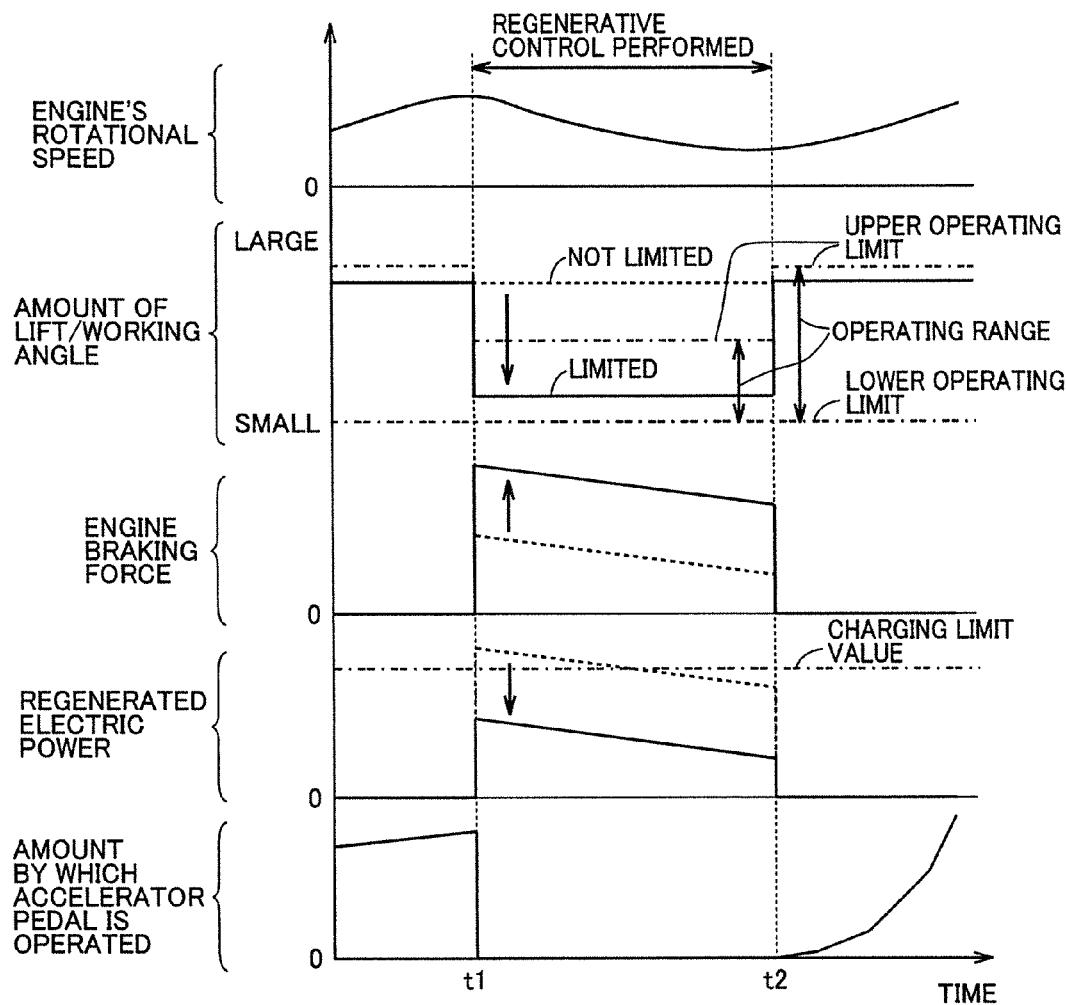
FIG. 12 is timing plots for illustrating how the FIG. 1 control device controls the intake valve.
Figure 15:
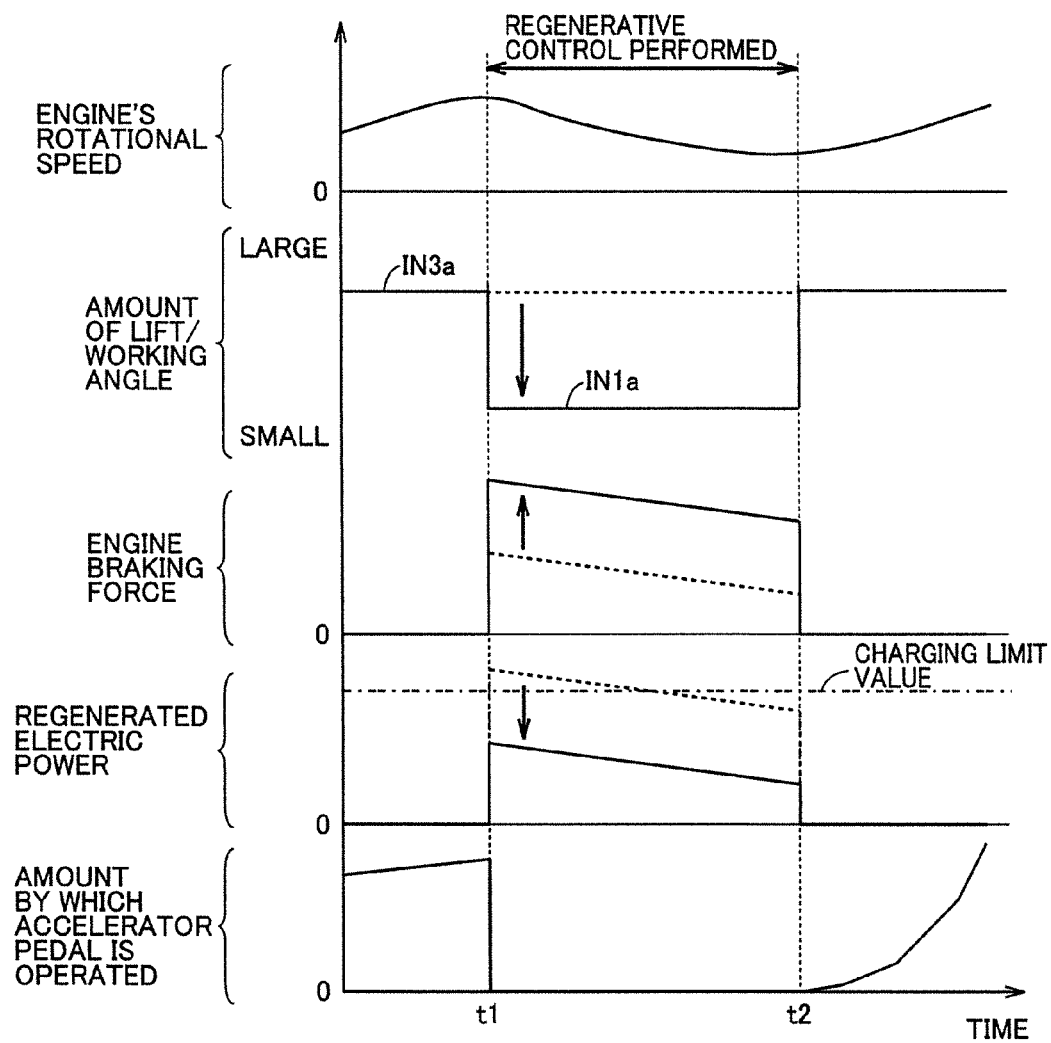
FIG. 15 is timing plots for illustrating how the control device that controls the VVL device having the FIG. 13 actuation characteristic controls the intake valve.

FIG. 12 is timing plots for illustrating how the FIG. 1 control device 200 controls the intake valve. In FIG. 12 and FIG. 15, the axis of abscissa represents time and the axis of ordinate represents the engine's rotational speed, the amount of lift, the working angle, engine braking force, regenerated electric power, and the amount by which the accelerator pedal is operated. Note that the amount of lift, the working angle, engine braking force, and regenerated electric power are represented by a solid line when the amount of lift and the working angle have their upper limit limited, and the amount of lift, the working angle, engine braking force, and regenerated electric power are represented by a broken line when the amount of lift and the working angle do not have their upper limit limited. Furthermore, the amount of lift and the working angle are represented with upper and lower operating limits indicated by an alternate long and short dashed line. Furthermore, regenerated electric power is represented together with power storage device B's charging limit value indicated by an alternate long and short dashed line.

With reference to FIG. 12, at time t1, the amount by which the accelerator pedal is operated decreases to zero, and accordingly, supplying engine 100 with fuel is stopped and regenerative control starts. In doing so, when the amount of lift and the working angle have their upper limit limited, they are decreased and engine 100 generates increased engine braking force. The regenerative braking force of motor generator MG2 can thus be reduced and hence the electric power that is regenerated by motor generator MG2 can be reduced to be equal to or smaller than power storage device B's charging limit value.

At time t2, the accelerator pedal is operated again, and accordingly, supplying engine 100 with fuel is resumed and driving force is generated. At the time, regenerative control stops and limiting the upper limit of the amount of lift and working angle is cleared. The amount of lift and the working angle are determined depending on engine 100's rotational speed and load.

Thus, in the present embodiment, when regenerative control is performed, VVL device 400 is controlled to limit an upper limit of at least one of an amount of lifting intake valve 118 and a working angle on intake valve 118 to be lower than when regenerative control is not performed. Accordingly, when regenerative control is performed, at least one of the amount of lift and the working angle is reduced and engine 100 has an increased pumping loss. Thus, engine 100's braking force can be increased and braking force via regenerative braking can be reduced so that power storage device B can be charged in an amount reduced to be smaller than acceptable electric power. Thus in the present embodiment power storage device B's degradation can be reduced/prevented while engine braking force is ensured.

Furthermore, in the present embodiment, when regenerative control is performed, VVL device 400 is controlled to limit an upper limit of at least one of an amount of lifting intake valve 118 and a working angle on intake valve 118, whereas when regenerative control is not performed, VVL device 400 is controlled to determine at least one of the amount of lifting intake valve 118 and the working angle on intake valve 118, depending on engine 100's rotational speed and load. Thus at least one of the amount of the lifting and the working angle can be controlled, as appropriate, depending on whether regenerative control is performed.

Furthermore in the present embodiment when regenerative control is not performed and the electric power discharged from power storage device B is limited, VVL device 400 is controlled to limit the upper limit of at least one of the amount of lifting intake valve 118 and the working angle on intake valve 118 to be lower than when regenerative control is not performed and the electric power discharged from power storage device B is not limited. Thus, at least one of the amount of lifting intake valve 118 and the working angle on intake valve 118 can be reduced, and enhanced engine torque response can be achieved. Thus a reduced torque output from motor generator MG2 in acceleration can be compensated for by engine 100's driving force.

Note that the amount of lifting intake valve 118 and the working angle on intake valve 118 may be varied steplessly or discretely (or in steps).

Figure 13:
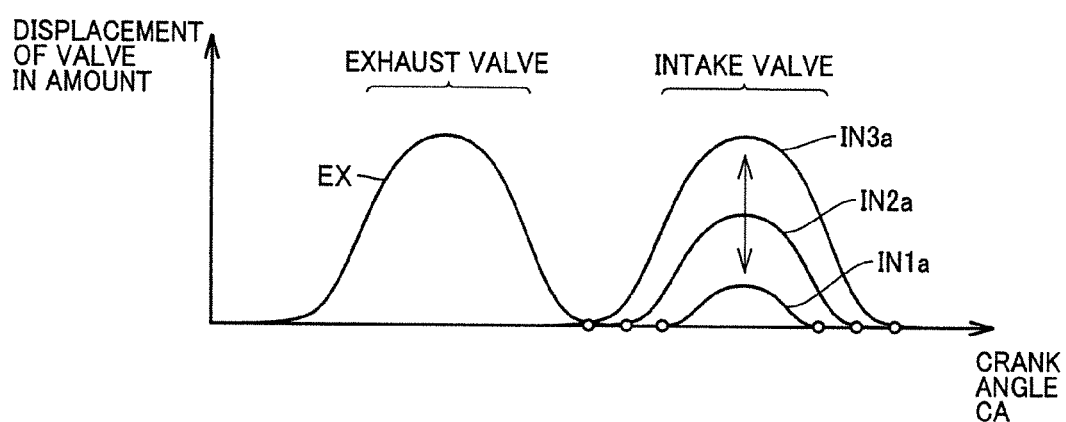
FIG. 13 represents a relationship between valve lift and crank angle, as implemented by a VVL device that can vary the intake valve's actuation characteristic in three levels.

FIG. 13 represents a relationship between valve displacement in amount and crank angle, as implemented by a VVL device 400A that can vary intake valve 118's actuation characteristic in three levels. VVL device 400A is configured to be capable of varying the actuation characteristic to be any one of first to third characteristics. The first characteristic is represented by a waveform IN1a. The second characteristic is represented by a waveform IN2a and corresponds to a larger amount of lift and a larger working angle than the first characteristic. The third characteristic is represented by a waveform IN3a and corresponds to a larger amount of lift and a larger working angle than the second characteristic.

Figure 14:
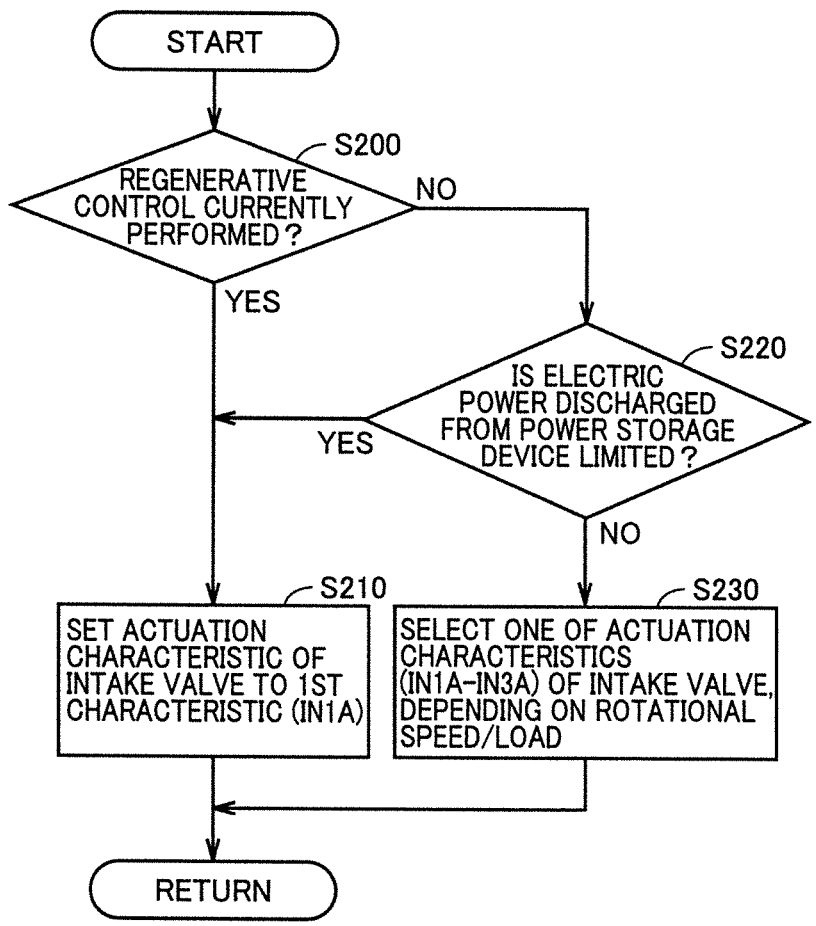
FIG. 14 is a flowchart for illustrating a process done by a control device that controls a VVL device having the FIG. 13 actuation characteristic to control the intake valve.

FIG. 14 is a flowchart for illustrating a process done by a control device 200A that controls VVL device 400A having the FIG. 13 actuation characteristic to control the intake valve. With reference to FIG. 14, control device 200A in S200 determines whether regenerative control is currently performed. If so (YES in S200), control device 200A controls VVL device 400A to set the actuation characteristic of intake valve 118 to the first characteristic (IN1a) (S210).

If not (NO in S200) control device 200A determines whether the electric power discharged from power storage device B is limited (S220). If so (YES in S220), the control proceeds to S210.

If not (NO in S220), control device 200A controls VVL device 400A to select one of the first to third characteristics (IN1a-IN3a), depending on engine 100's rotational speed and load (S230).

More specifically, as has been described with reference to FIG. 10, for the low rotational speed range (range R1) and the high rotational speed range (range R3), the amount of lifting intake valve 118 and the working angle on intake valve 118 are increased, i.e., the third characteristic (IN3a) is selected as the actuation characteristic of intake valve 118. For the medium rotational speed range (range R2), an intermediate amount of lifting intake valve 118 and an intermediate working angle on intake valve 118 are selected, i.e., the second characteristic (IN2a) is selected as the actuation characteristic of intake valve 118. When engine 100 is operated in the low rotational speed range at a large load; engine 100 is started at cryogenic temperature; or a catalyst is warmed up, the amount of lifting intake valve 118 and the working angle on intake valve 118 are decreased, i.e., the first characteristic (IN1a) is selected as the actuation characteristic of intake valve 118.

FIG. 15 is timing plots for illustrating how control device 200A that controls VVL device 400A having the FIG. 13 actuation characteristic controls the intake valve. With reference to FIG. 15, at time t1, the amount by which the accelerator pedal is operated decreases to zero, and accordingly, supplying engine 100 with fuel is stopped and regenerative control starts. In doing so when intake valve 118's actuation characteristic is set to the first characteristic (IN1a), the amount of lift and the working angle are reduced and engine 100 generates increased engine braking force. The regenerative braking force of motor generator MG2 can thus be reduced and hence the electric power that is regenerated by motor generator MG2 can be reduced to be equal to or smaller than power storage device B's charging limit value.

At time t2, the accelerator pedal is operated again, and accordingly, supplying engine 100 with fuel is resumed and driving force is generated. At the time, regenerative control stops and limiting the upper limit of the amount of lift and working angle is cleared. Intake valve 118's actuation characteristic is set to one of the first to third characteristics (IN1a-IN3a), as selected depending on engine 100's rotational speed and load.

This allows intake valve 118 to be lifted in an amount and worked by a working angle that are limited to three actuation characteristics, and engine 100's operation state can be controlled via a control parameter adapted in a period of time shorter than required when intake valve 118 is lifted in a steplessly varying amount and worked by a steplessly varying working angle. Furthermore, a torque that an actuator requires to vary the amount of lifting intake valve 118 and the working angle on intake valve 118 can be reduced and the actuator can thus be reduced in size and weight. The actuator can thus be produced at a reduced cost.

Figure 16:
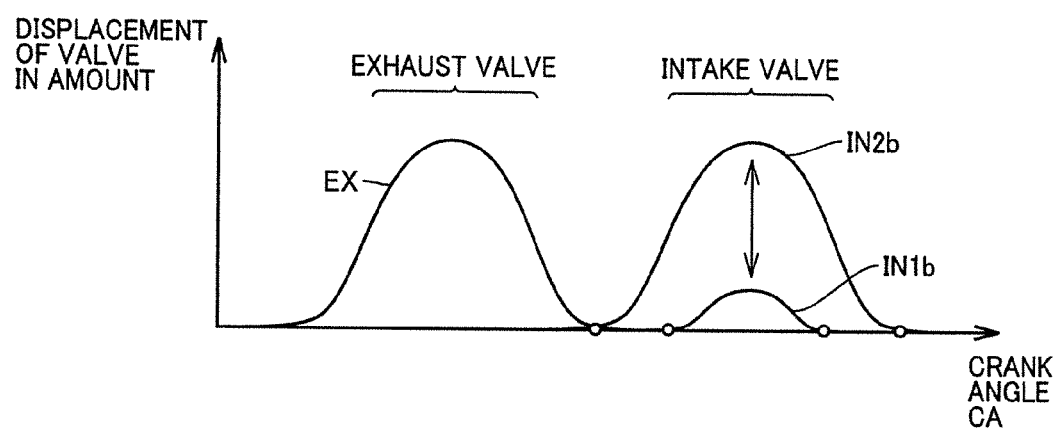
FIG. 16 represents a relationship between valve lift and crank angle, as implemented by a VVL device that can vary the intake valve's actuation characteristic in two levels.

FIG. 16 represents a relationship between valve displacement in amount and crank angle, as implemented by a VVL device 400B that can vary intake valve 118's actuation characteristic in two levels. VVL device 400B is configured to be capable of varying the actuation characteristic to be any one of first and second characteristics. The first characteristic is represented by a waveform IN1b. The second characteristic is represented by a waveform IN2b and corresponds to a larger amount of lift and a larger working angle than the first characteristic.

In this example, when regenerative control is performed, VVL device 400B is controlled to allow intake valve 118's actuation characteristic to be the first characteristic, whereas when regenerative control is not performed, VVL device 400B is controlled to determine one of the first and second characteristics, depending on engine 100's rotational speed and load. Furthermore, when regenerative control is not performed and the electric power discharged from power storage device B is limited, VVL device 400B is controlled to allow intake valve 118's actuation characteristic to be the first characteristic, This allows intake valve 118 to be lifted in an amount and worked by a working angle that are limited to two actuation characteristics, and engine 100's operation state can be controlled via a control parameter adapted in a further shorter period of time. Furthermore, the actuator is allowed to have a simpler configuration. Note that intake valve 118 may not be lifted in an amount or worked by a working angle that are limited to an actuation characteristic varying between two or three levels, and intake valve 118 may be lifted in an amount or worked by a working angle with an actuation characteristic varying between four or more levels.

While the above embodiment has been described for a case with the amount of lifting intake valve 118 and the working angle on intake valve 118 both varied, the present invention is also applicable to a case with the amount of lifting intake valve 118 alone varied and a case with the working angle on intake valve 118 alone varied. A configuration that can vary either the amount of lifting intake valve 118 or the working angle on intake valve 118 can be as effective as that which can vary both the amount of lifting intake valve 118 and the working angle on intake valve 118. Note that the configuration that can vary either the amount of lifting intake valve 118 or the working angle on intake valve 118 can be implemented via well known technology.

While the above embodiment has been described in connection with a series/parallel type hybrid vehicle capable of splitting the motive power of engine 100 by power split device 4 and thus transmitting the split motive power to driving wheel 6 and motor generators MG1 and MG2, the present invention is also applicable to hybrid vehicles of other types. More specifically, the present invention is for example also applicable to a hybrid vehicle recovering only regenerated energy of kinetic energy that is generated by engine 100 as electrical energy, a motor-assisted hybrid vehicle using an engine as a main motive power source and assisted by a motor as required, and the like.

Note that, in the above, engine 100 corresponds in the present invention to one embodiment of an internal combustion engine and motor generator MG2 corresponds in the present invention to one embodiment of a rotating electric machine. Furthermore, VVL device 400 corresponds in the present invention to one embodiment of a variable valve actuation device.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control device for a hybrid vehicle including an internal combustion engine having a variable valve lift device that varies an actuation characteristic of an intake valve, and a rotating electric machine generating braking force for the hybrid vehicle through performing electric power regeneration, the control device comprising:
    a controller operatively connected to the variable valve lift device, the controller configured to:
    perform regenerative control to perform the electric power regeneration; and
    control the variable valve lift device to limit an upper limit of at least one of an amount of lifting the intake valve and a working angle on the intake valve that is applied when the regenerative control is performed to be lower than an upper limit of at least one of the amount of lifting and the working angle that is applied when the regenerative control is not performed.

2. The control device for a hybrid vehicle according to claim 1, wherein
    the hybrid vehicle further includes a battery that stores electric power for driving the rotating electric machine, and
    when the regenerative control is not performed and electric power discharged from the battery is limited, the controller limits the upper limit of at least one of the amount of lifting and the working angle to be lower than an upper limit of at least one of the amount and the angle that is applied when the regenerative control is not performed and the electric power discharged from the battery is not limited.

3. The control device for a hybrid vehicle according to claim 1, wherein
    the variable valve lift device switches the actuation characteristic of the intake valve to any one of a first characteristic and a second characteristic allowing at least one of the amount of lifting and the working angle to be larger than when the actuation characteristic is the first characteristic, and
    when the regenerative control is performed, the controller controls the variable valve lift device to allow the actuation characteristic of the intake valve to be the first characteristic, whereas when the regenerative control is not performed, the controller controls the variable valve lift device to allow the actuation characteristic of the intake valve to be one of the first and second characteristics depending on a rotational speed and load of the internal combustion engine.

4. The control device for a hybrid vehicle according to claim 3, wherein
    the hybrid vehicle further includes a battery that stores electric power for driving the rotating electric machine, and
    when the regenerative control is not performed and electric power discharged from the battery is limited, the controller controls the variable valve lift device to allow the actuation characteristic of the intake valve to be the first characteristic.

5. The control device for a hybrid vehicle according to claim 1, wherein
    the variable valve lift actuation switches the actuation characteristic of the intake valve to any one of a first characteristic, a second characteristic allowing at least one of the amount of lifting and the working angle to be larger than when the actuation characteristic is the first characteristic, and a third characteristic allowing at least one of the amount of lifting and the working angle to be larger than when the actuation characteristic is the second characteristic, and
    when the regenerative control is performed, the controller controls the variable valve lift device to allow the actuation characteristic of the intake valve to be the first characteristic, whereas when the regenerative control is not performed, the controller controls the variable valve lift device to allow the actuation characteristic of the intake valve to be one of the first to third characteristics depending on a rotational speed and load of the internal combustion engine.

6. The control device for a hybrid vehicle according to claim 5, wherein
    the hybrid vehicle further includes a battery that stores electric power for driving the rotating electric machine, and
    when the regenerative control is not performed and electric power discharged from the battery device is limited, the controller controls the variable valve lift device to allow the actuation characteristic of the intake valve to be the first characteristic.

7. The control device for a hybrid vehicle according to claim 1, wherein when the regenerative control is performed, the controller controls the variable valve lift device to limit said upper limit of the at least one of the amount of lifting and the working angle, whereas when the regenerative control is not performed, the controller controls the variable valve lift device to determine at least one of the amount of lifting and the working angle, depending on a rotational speed and load of the internal combustion engine.

8. The control device for a hybrid vehicle according to claim 7, wherein
    the hybrid vehicle further includes a battery that stores electric power for driving the rotating electric machine, and
    when the regenerative control is not performed and electric power discharged from the battery is limited, the controller limits the upper limit of at least one of the amount of lifting and the working angle to be lower than an upper limit of at least one of the amount of lifting and the working angle that is applied when the regenerative control is not performed and the electric power discharged from the battery is not limited.

9. The control device for a hybrid vehicle according to claim 7, wherein
    the variable valve lift actuation switches the actuation characteristic of the intake valve to any one of a first characteristic and a second characteristic allowing at least one of the amount of lifting and the working angle to be larger than when the actuation characteristic is the first characteristic, and
    when the regenerative control is performed, the controller controls the variable valve lift device to allow the actuation characteristic of the intake valve to be the first characteristic, whereas when the regenerative control is not performed, the controller controls the variable valve lift device to allow the actuation characteristic of the intake valve to be one of the first and second characteristics depending on a rotational speed and load of the internal combustion engine.

10. The control device for a hybrid vehicle according to claim 9, wherein
the hybrid vehicle further includes a battery that stores electric power for driving the rotating electric machine, and
when the regenerative control is not performed and electric power discharged from the battery is limited, the controller controls the variable valve lift device to allow the actuation characteristic of the intake valve to be the first characteristic.

11. The control device for a hybrid vehicle according to claim 7, wherein
the variable valve lift actuation switches the actuation characteristic of the intake valve to any one of a first characteristic, a second characteristic allowing at least one of the amount of lifting and the working angle to be larger than when the actuation characteristic is the first characteristic, and a third characteristic allowing at least one of the amount of lifting and the working angle to be larger than when the actuation characteristic is the second characteristic, and
when the regenerative control is performed, the controller controls the variable valve lift device to allow the actuation characteristic of the intake valve to be the first characteristic, whereas when the regenerative control is not performed, the controller controls the variable valve lift device to allow the actuation characteristic of the intake valve to be one of the first to third characteristics depending on a rotational speed and load of the internal combustion engine.

12. The control device for a hybrid vehicle according to claim 11, wherein
the hybrid vehicle further includes a battery that stores electric power for driving the rotating electric machine, and
when the regenerative control is not performed and electric power discharged from the battery is limited, the controller controls the variable valve lift device to allow the actuation characteristic of the intake valve to be the first characteristic.

13. A method for controlling a hybrid vehicle including an internal combustion engine having a variable valve lift device that varies an actuation characteristic of an intake valve, and a rotating electric machine generating braking force for the hybrid vehicle through performing electric power regeneration, the method comprising the steps of:
performing regenerative control to perform the electric power regeneration; and
controlling the variable valve lift device to limit an upper limit of at least one of an amount of lifting the intake valve and a working angle on the intake valve that is applied when the regenerative control is performed to be lower than an upper limit of at least one of the amount of lifting and the working angle that is applied when the regenerative control is not performed.

14. A control device for a hybrid vehicle including an internal combustion engine having a variable valve lift device that varies an actuation characteristic of an intake valve, and a rotating electric machine generating braking force for the hybrid vehicle through performing electric power regeneration, the control device comprising:
an electronic circuit operatively connected to the variable valve lift device, the electronic circuit configured to:
perform regenerative control to perform the electric power regeneration; and
control the variable valve lift device to limit an upper limit of at least one of an amount of lifting the intake valve and a working angle on the intake valve that is applied when the regenerative control is performed to be lower than an upper limit of at least one of the amount of lifting and the working angle that is applied when the regenerative control is not performed.

15. The control device for a hybrid vehicle according to claim 14, wherein
the hybrid vehicle further includes a battery that stores electric power for driving the rotating electric machine, and
when the regenerative control is not performed and electric power discharged from the battery is limited, the electronic circuit limits the upper limit of at least one of the amount of lifting and the working angle to be lower than an upper limit of at least one of the amount of lifting and the working angle that is applied when the regenerative control is not performed and the electric power discharged from the battery is not limited.

16. The control device for a hybrid vehicle according to claim 14, wherein
the variable valve lift device switches the actuation characteristic of the intake valve to any one of a first characteristic and a second characteristic allowing at least one of the amount of lifting and the working angle to be larger than when the actuation characteristic is the first characteristic, and
when the regenerative control is performed, the electronic circuit controls the variable valve lift device to allow the actuation characteristic of the intake valve to be the first characteristic, whereas when the regenerative control is not performed, the electronic circuit controls the variable valve lift device to allow the actuation characteristic of the intake valve to be one of the first and second characteristics depending on a rotational speed and load of the internal combustion engine.

17. The control device for a hybrid vehicle according to claim 16, wherein
the hybrid vehicle further includes a battery that stores electric power for driving the rotating electric machine, and
when the regenerative control is not performed and electric power discharged from the battery is limited, the electronic circuit controls the variable valve lift device to allow the actuation characteristic of the intake valve to be the first characteristic.

18. The control device for a hybrid vehicle according to claim 14, wherein
the variable valve lift actuation switches the actuation characteristic of the intake valve to any one of a first characteristic, a second characteristic allowing at least one of the amount of lifting and the working angle to be larger than when the actuation characteristic is the first characteristic, and a third characteristic allowing at least one of the amount of lifting and the working angle to be larger than when the actuation characteristic is the second characteristic, and
when the regenerative control is performed, the electronic circuit controls the variable valve lift device to allow the actuation characteristic of the intake valve to be the first characteristic, whereas when the regenerative control is not performed, the electronic circuit controls the variable valve lift device to allow the actuation characteristic of the intake valve to be one of the first to third characteristics depending on a rotational speed and load of the internal combustion engine.

19. The control device for a hybrid vehicle according to claim 18, wherein the hybrid vehicle further includes a battery that stores electric power for driving the rotating electric machine, and when the regenerative control is not performed and electric power discharged from the battery device is limited, the electronic circuit controls the variable valve lift device to allow the actuation characteristic of the intake valve to be the first characteristic.

20. The control device for a hybrid vehicle according to claim 14, wherein when the regenerative control is performed, the electronic circuit controls the variable valve lift device to limit the upper limit of the at least one of the amount of lifting and the working angle, whereas when the regenerative control is not performed, the electronic circuit controls the variable valve lift device to determine at least one of the amount of lifting and the working angle, depending on a rotational speed and load of the internal combustion engine.

\* \* \* \* \*